United States Patent
Eneyo et al.

(10) Patent No.: US 12,318,030 B1
(45) Date of Patent: Jun. 3, 2025

(54) INTEGRATED KITCHEN APPARATUS FOR FOOD PREPARATION AND FOOD SERVICE DELIVERY

(71) Applicants: Emmanuel S. Eneyo, Tomball, TX (US); Grace E. Eneyo, Tomball, TX (US)

(72) Inventors: Emmanuel S. Eneyo, Tomball, TX (US); Grace E. Eneyo, Tomball, TX (US)

( * ) Notice: Subject to any disclaimer, the term of this patent is extended or adjusted under 35 U.S.C. 154(b) by 0 days.

(21) Appl. No.: 19/022,578

(22) Filed: Jan. 15, 2025

Related U.S. Application Data

(60) Provisional application No. 63/630,280, filed on Jan. 22, 2024.

(51) Int. Cl.
*A47J 27/04* (2006.01)
*A47J 27/16* (2006.01)

(52) U.S. Cl.
CPC ............. *A47J 27/04* (2013.01); *A47J 27/16* (2013.01); *A47J 2027/043* (2013.01)

(58) Field of Classification Search
CPC ...... A47J 27/04; A47J 2027/043; A47J 27/05; A47J 27/06; A47J 27/16
USPC .......... 99/415, 416, 417, 418, 448, 449, 483
See application file for complete search history.

(56) References Cited

U.S. PATENT DOCUMENTS

| | | | | |
|---|---|---|---|---|
| 5,865,098 A | * | 2/1999 | Anelli | A47J 27/004 219/442 |
| 5,890,421 A | * | 4/1999 | Smith-Berry | A21B 3/134 99/441 |
| 8,025,007 B1 | * | 9/2011 | Boyer | A47J 37/1242 99/450 |
| 2009/0068332 A1 | * | 3/2009 | Idowu | A23N 5/00 99/602 |

FOREIGN PATENT DOCUMENTS

| | | | | |
|---|---|---|---|---|
| EP | 2407070 A1 | * | 1/2012 | ............. A47J 27/06 |
| FR | 2846215 A1 | * | 4/2004 | ............. A47J 27/05 |
| KR | 20120062454 A | * | 6/2012 | ............. A47J 27/05 |

* cited by examiner

*Primary Examiner* — Reginald Alexander
(74) *Attorney, Agent, or Firm* — Daniel Polk; Darryl E. Scott

(57) ABSTRACT

A steaming plate having an array of apertures and an array of vents positioned and distributed individually between the array of apertures. The steaming plate has a surface section, an interior section, and an exterior section. A first leg coupled to the interior section and to the exterior section. A second leg coupled to the interior section and to the exterior section. A third leg coupled to the interior section and to the exterior section A handle coupled to the surface section. An array of cups is coupled to the array of apertures. An array of lids is coupled to the array of cups. The array of lids has a knob centrally positioned on the array of lids.

8 Claims, 5 Drawing Sheets

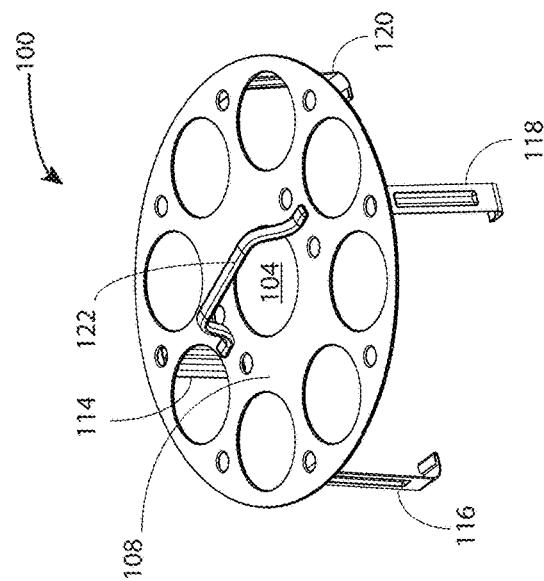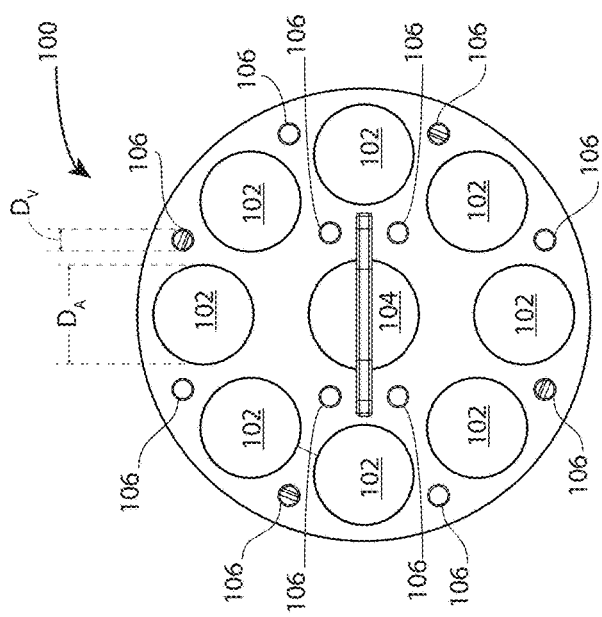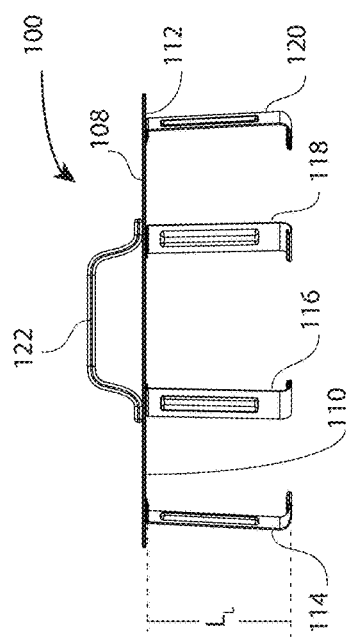

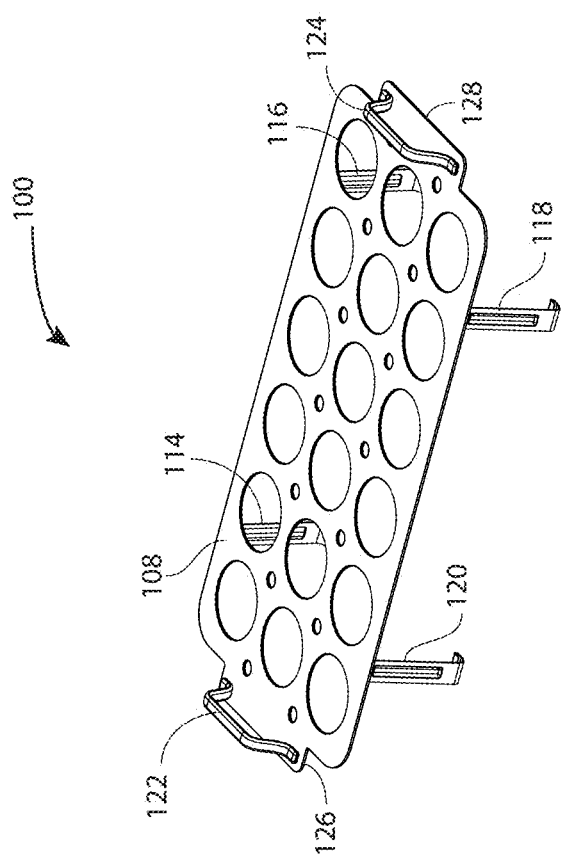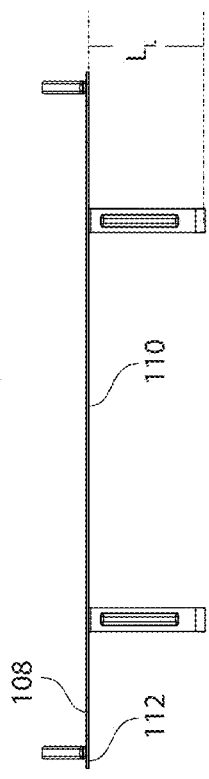

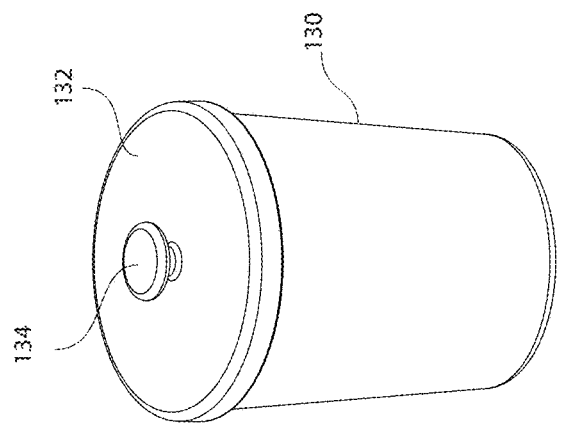
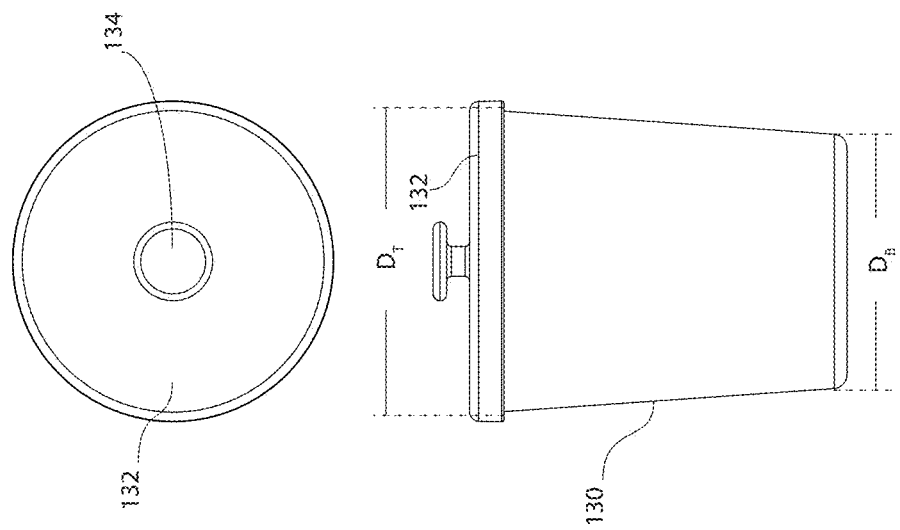

INTEGRATED KITCHEN APPARATUS FOR FOOD PREPARATION AND FOOD SERVICE DELIVERY

CROSS-REFERENCE TO RELATED APPLICATIONS

This application claims the benefit of prior-filed provisional application No. 63/630,280, filed on Jan. 22, 2024.

BACKGROUND

Food preparation and traditional recipes are vital to a community's cultural heritage. These cultural traditions are passed down from generation to generation. For example, a delicacy known as Moin-Moin is a steamed bean pudding well known in West Africa. Moin-Moin is traditionally prepared by steaming bean pudding in aluminum foil, plastic containers, or ramekins on a steamer rack placed inside a pot of boiling water. This cooking method creates many challenges. For example, there are practical and health concerns with this cooking technique. Cooking with aluminum foil is inconvenient, fragile, nonstick-resistant, and a poor heat conductor, resulting in food having acidic or salty ingredients. In addition, aluminum foil also creates unnecessary waste that could potentially impact the environment. Using ramekins as an alternative does not resolve this issue. Steam cooking with ramekins requires careful balancing to avoid tipping, which may not allow for uniform cooking. Conveniently cooking Moin-Moin is a challenge.

BRIEF DESCRIPTION OF THE DRAWINGS

FIG. 1 is an aerial view of a steaming plate having a circular shape.

FIG. 2 is a profile view of a steaming plate having a circular shape.

FIG. 3 is a perspective view of a steaming plate having a circular shape.

FIG. 4 is an aerial view of a steaming plate having a rectangular shape.

FIG. 5 is a profile view of a steaming plate having a rectangular shape.

FIG. 6 is a perspective view of a steaming plate having a rectangular shape.

FIG. 7 is an aerial view of a cup having a lid.

FIG. 8 is a profile view of a cup having a lid.

FIG. 9 is a perspective view of a cup having a lid.

DETAILED DESCRIPTION

Figure 10:
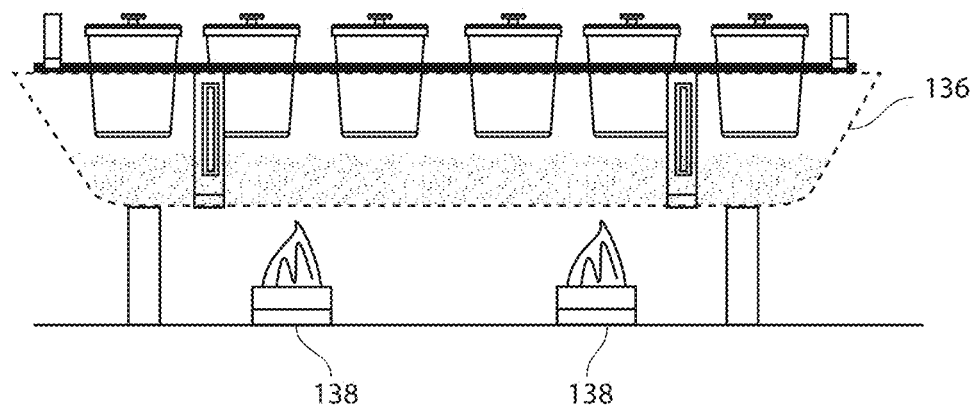
FIG. 10 is a schematic profile view of a steaming plate having a rectangular shape, an array of cups having a lid, a steaming chamber, and a heat-source.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Considered by many West African cultures, one of the most healthy, delicious, and popular dishes is a bean pudding commonly known as Moin-Moin. Moin-Moin is also known as Mai-Mai, Moir-Moi, Olele, or Moyin-Moyin. This bean pudding dish is made from skinless black-eyed beans or brown beans that are grounded into a paste or pudding form with the added ingredients of tomato sauce and other seasonings.

Traditionally, the method of creating the Moin-Moin dish comprises wrapping the pudding in either banana leaves, aluminum foil, or tin cans. The pudding-filled wrappings are then steamed heated by placing the wrapped food into a pot of water. However, this method of preparing Moin-Moin has many challenges. For example, the method is tedious and time-consuming. Folding or preparing the banana leaves or the aluminum foil often leads to spillage, mess, and waste. Additionally, these methods may create the possibility of unsanitary food handling. Heating the wrapped pudding submerged in heated water also presents the risk of water sipping into the dish, which may alter the texture of the cooked food, making it marshy or soggy.

The estimation of the desired water level can also present challenges. For example, too much water may oversaturate the wrapped pudding; or too little water may dry out the wrapped pudding if not constantly monitored. Further, wrapping tools, such as banana leaves are not always readily available This traditional method also affects the presentation of the dish. For example, serving Moin-Moin that was prepared using aluminum foil or banana leaves is visually unpleasant, unclean, distasteful, and generally messy. An individual would have to physically unwrap the dish, often by hand, which could be unsanitary.

Conversely, if the dish was previously unwrapped and then served, the presentation is usually unappealing and unappetizing by sight, especially in a larger setting service, thereby, making the dish prone to waste. Finally, it has been documented and studied that there are major health risks and concerns regarding the use of tin cans and aluminum foil in food preparation. Many scholars and researchers believe that cooking with aluminum foil may increase the aluminum content in food because these tools may leak aluminum into food which could cause Alzheimer's disease.

The embodiments describe herein are of an apparatus that provides a safer, cleaner, and more visually desirable method of preparing this specific West African dish and many other dishes that require steam cooking. This steaming apparatus may vary in size depending on the scope and scale of the food preparation. This steaming apparatus may also be manufactured from a metallic alloy such as stainless steel or other similar material. In addition, embodiments feature legs or stands that enable cups filled with the pudding to be suspended on the apparatus without the cup touching the bottom of the cooking or steaming pot. The suspension of the cups allows the food to be cooked completely without water entering the food thereby avoiding sogginess. The integrated apparatus can be stacked for double quantity of food production in the cooking chambers.

To better illustrate this apparatus, FIG. 1 is an aerial view of a steaming plate having a circular shape. FIG. 2 is a profile view of a steaming plate having a circular shape, and FIG. 3 is a perspective view of a steaming plate having a circular shape.

As illustrated in FIGS. 1-3, an apparatus for steaming food may include a steaming plate 100. In the context of this disclosure, the term "steaming plate" is used solely to describe the intended function or use of the plate as part of a steaming process or apparatus. It is not intended to imply or describe an action wherein steam is actively rising from, around, or near the plate itself. Instead, the term should be understood as referring to a component utilized within a system or method designed for steaming purposes. The steaming plate 100 may form a circular or oval shape such that it has a diameter. The steaming plate 100 is comparatively thin having a measurement of thickness ranging from 0.0625 inches to 0.781 inches. In one or more embodiments, the steaming plate 100 may include an array of apertures 102. Note, for clarity, only apertures 102 in FIG. 1 are label. The array of apertures 102 are bored holes in the steaming plate 100 that holds cups (discussed further in connection to FIGS. 7-9) for steaming food. In one or more embodiments, the array of apertures 102 may be uniformly positioned along a circumference of the steaming plate 100. That is, the apertures 102 are placed near the perimeter (i.e., outer edge) of the steaming plate 100. Although FIGS. 1 and 3 illustrate eight apertures 102, it is understood that the steaming plate 100 may include fewer or greater number of apertures 102 than that illustrated in FIGS. 1 and 3.

As further illustrated in FIGS. 1 and 3, the steaming plate 100 may include a liquid deposit hole 104 centrally positioned on the steaming plate 100. The liquid deposit hole 104 is an orifice that allows liquid, such as water, to be poured into a steaming chamber (further described in connection to FIGS. 10 and 11), such as a cooking pot; and to allow heat to be evenly distributed across the heating chamber. In one or more embodiments, the steaming plate 100 may include an array of vents 106 positioned and distributed individually between the array of apertures 102. That is, a single vent 106 is positioned between each corresponding aperture 102. Additionally, as illustrated in FIGS. 1 and 3, at least four additional vents 106 are positioned around the liquid deposit hole 104. In operation, the vents 106 serve the purpose of allowing steam to escape a chamber such that internal chamber heat can be maintained at a desired temperature. Note, for clarity, the array of vents 106 are only labeled in FIG. 1.

In one or more embodiments, as illustrated in FIGS. 1 and 3, the array of apertures 102 has an aperture diameter ($D_A$), and the array of vents 106 has a vent diameter ($D_V$). The aperture diameter ($D_A$) is greater than the vent diameter ($D_V$).

As more clearly illustrated in FIGS. 2 and 3, the steaming plate 100 has a surface section 108. The surface section 108 of the steaming plate 100 is considered the top of the steaming plate 100. That is, as illustrated in FIG. 2, the surface section 108 is the section of the steaming plate 100 that would be positioned away from a heating source, such as water heated steam. Conversely, in one or more embodiments, the steaming plate 100 has an interior section 110, which is the underneath section of the steaming plate 100 that would be in direct connection to a heating source, such as water heated steam. In addition, the steaming plate 100 has an exterior section 112. The exterior section 112 is the outer perimeter section of the steaming plate 100.

In one or more embodiments, as illustrated in FIGS. 2 and 3, the steaming plate 100 includes a first leg 114 coupled to the interior section 110 and to the exterior section 112. A second leg 116 may be coupled to the interior section 110 and to the exterior section 112. A third leg 118 may be coupled to the interior section 110 and to the exterior section 112. A fourth leg 120 may be coupled to the interior section 110 and to the exterior section 112. Although FIGS. 2 and 3 illustrate four legs, it is presumed that the steaming plate 100 may have greater or fewer legs than that illustrated. In one or more embodiments, the legs (i.e., first leg 114, second leg 116, third leg 118, and fourth leg 120) have a leg length ($L_L$). The position and design of the legs allow for the uninterrupted distribution of water in the steaming chamber. Further the leg length ($L_L$) also allows the food to be in an ideal position for optimal cooking.

In one or more embodiments, a handle 122 is coupled to the surface section 108 of the steaming plate 100. Although FIGS. 1-3 illustrate the handle 122 centrally positioned over the liquid deposit hole 104, the handle 122 may be positioned on other areas of the steam plate 100 for ease of function.

In one or more embodiments, the steaming plate 100 may form various other shapes. For example, FIG. 4 is an aerial view of a steaming plate having a rectangular shape. FIG. 5 is a profile view of a steaming plate having a rectangular shape. FIG. 6 is a perspective view of a steaming plate having a rectangular shape. As illustrated in FIGS. 4-6, the steaming plate 100 may form a rectangular shape. Although the steaming plate 100 illustrated in FIGS. 4-6 forms a rectangular shape, the functionality and characteristics are similar to the steaming plate 100 illustrated in FIGS. 1-3. For example, in one or more embodiments, the rectangular steaming plate 100 in FIGS. 4-6 is comparatively thin having a measurement of thickness ranging from 0.0625 inches to 0.781 inches. The rectangular steaming plate 100 may include an array of apertures 102 (note, only FIG. 4 is labeled for clarity), which are bored holes in the steaming plate 100 that hold cups (discussed further in connection to FIGS. 7-9). In one or more embodiments, the array of apertures 102 may be aligned in rows encompassing the majority of the steaming plate 100. Although FIGS. 4 and 6 illustrate eighteen apertures 102, it is understood that the steaming plate 100 may include fewer or greater number of apertures 102 than that illustrated in FIGS. 4 and 6.

The rectangular steaming plate 100 (similar to the circular steaming plate 100) may include an array of vents 106 positioned and distributed individually between the array of apertures 102. Note, only FIG. 4 is labeled with the vents 106 for clarity. Except for the middle row of apertures 102, an individual vent 106 is positioned between each corresponding aperture 102. In one or more embodiments, although not labeled for clarity of the figure, the array of apertures 102 has an aperture diameter ($D_A$), and the array of vents 106 has a vent diameter ($D_V$). The aperture diameter ($D_A$) is greater than the vent diameter ($D_V$).

As more clearly illustrated in FIGS. 5 and 6, the steaming plate 100 has a surface section 108. The surface section 108 of the steaming plate 100 is considered the top of the steaming plate 100. That is, as illustrated in FIG. 3, the surface section 108 is the section of the steaming plate 100 that would be positioned away from a heating source, such as water heated steam. Conversely, in one or more embodiments, the steaming plate 100 has an interior section 110, which is the underneath section of the steaming plate 100 that would be in direct connection to a heating source, such as water heated steam. In addition, the steaming plate 100 has an exterior section 112. The exterior section 112 is the outer perimeter section of the steaming plate 100.

In one or more embodiments, as illustrated in FIGS. 5 and 6, the steaming plate 100 includes a first leg 114 coupled to the interior section 110 and to the exterior section 112. A second leg 116 may be coupled to the interior section 110 and to the exterior section 112. A third leg 118 may be coupled to the interior section 110 and to the exterior section 112. A fourth leg 120 may be coupled to the interior section 110 and to the exterior section 112. Although FIG. 6 illustrates four legs, it is presumed that the steaming plate 100 may have greater or fewer legs than that illustrated. In one or more embodiments, the legs (i.e., first leg 114, second leg 116, third leg 118, and fourth leg 120) have a leg length ($L_L$). The position and design of the legs allow for the uninterrupted distribution of water in the steaming chamber. Further the leg length ($L_L$) also allows the food to be in an ideal position for optimal cooking.

One variation that distinguish the rectangular steaming plate 100 from the circular steaming plate 100 is the placement of the handle 122 and the quantity of handles 122. For example, as illustrated in FIG. 6, the steaming plate 100 may include the handle 122 positioned on an extrusion 126 integrally coupled to one side of the steaming plate 100. That is, the handle 122 is positioned on a perimeter section of the surface section 108 of the steaming plate 100. In one or more embodiments, a second handle 124 is positioned on a second extrusion 128 integrally coupled to the opposite side of the steaming plate 100. That is, the second handle 124 is positioned on the perimeter section of the surface section 108 opposite the first handle 122. The handles (i.e., handle 122 and second handle 124) allow for a user to lift the steaming plate 100 out of the steaming chamber.

Steaming Moin-Moin or other desired dishes require cooking containers, such as those illustrated in FIGS. 7-9. For example, FIG. 7 is an aerial view of a cup having a lid. FIG. 8 is a profile view of a cup having a lid. FIG. 9 is a perspective view of a cup having a lid. As illustrated in FIGS. 7-9 is a cup 130 having a removable lid 132. An array of cups 130 and their corresponding lids 132 are inserted into each aperture 102 when preparing to steam Moin-Moin or other desired dish. The lids 132 may be coupled to the cups 130 by way of a protruded lip (not visible) coupled to a top section of the cup 130.

In one or more embodiments, the cup 130 may have a top diameter ($D_T$) and a bottom diameter ($D_B$), wherein the top diameter ($D_T$) is greater than the bottom diameter ($D_B$). Further, for ease of access to the steamed dish, a knob 134 is centrally positioned on the lid 132.

Figure 11:
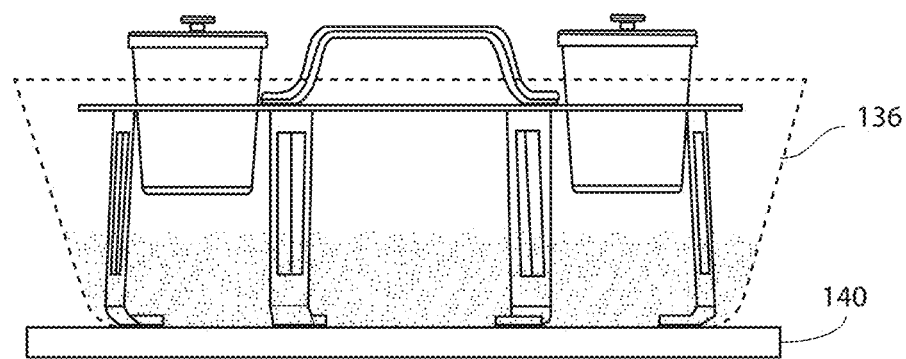
FIG. 11 is a schematic profile view of a steaming plate having a circular shape, an array of cups having a lid, a steaming chamber, and a heat-source.

FIGS. 10 and 11 illustrate the method of steaming the Moin-Moin or another desired dish. For example, FIG. 10 is a schematic profile view of a steaming plate having a rectangular shape, an array of cups having a lid, a steaming chamber, and a heat-source. FIG. 11 is a schematic profile view of a steaming plate having a circular shape, an array of cups having a lid, a steaming chamber, and a heat-source. As illustrated in FIGS. 10 and 11, the cups 130 are hovering above the steaming fluid. It is important that the cups 130 are maintained at a desired height away from the heating source. Thus, the leg length ($L_L$) is greater than the cup length ($L_C$).

In one or more embodiments, as illustrated in FIG. 10, the steaming chamber 136 and the array of cups 130 are placed in a steaming chamber 136 (illustrated by the dash lines for clarity) having a volume. The steaming chamber 136 may be a standard pot, pan, or even an oven that has the capacity to hold water for the purpose of steaming. The steaming chamber 136 may be heated by direct fire 138 such as those illustrated in FIG. 10 or a conventional stove 140 such as illustrated in FIG. 11.

Figure 12:
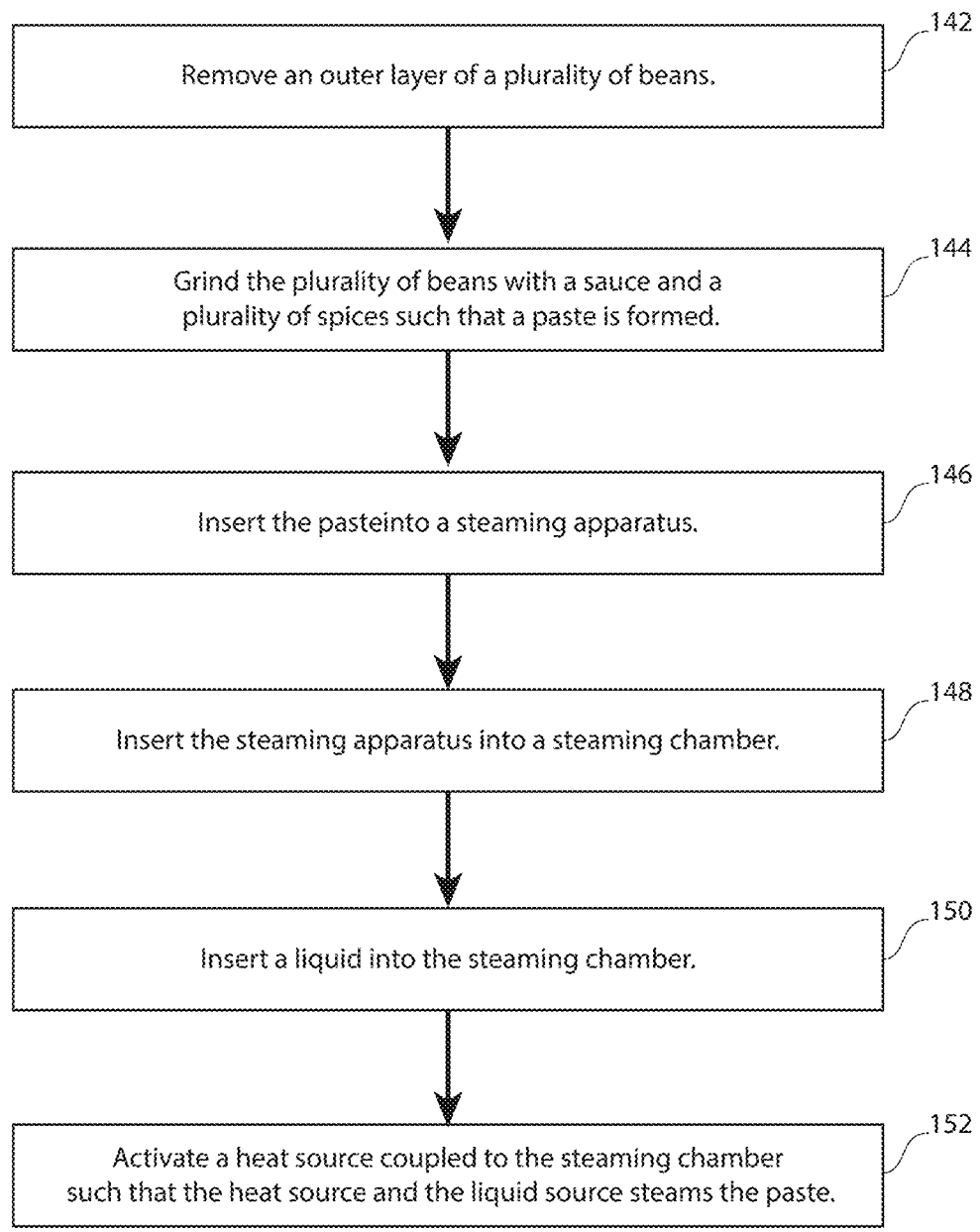
FIG. 12 is a flow chart of the method of steaming a dish.

In operation, FIG. 12 is a flow chart of the method of steaming a dish. To begin the process of preparing a steam dish, such as Moin-Moin, an outer layer of a plurality of beans is removed (block 142). The plurality of beans is ground with a sauce and a plurality of spices such that a paste is formed (block 144). The paste is inserted into a steaming apparatus (such as steaming plate 100) (block 146). The steaming apparatus (such as steaming plate 100) is then inserted into a steaming chamber (such as steaming chamber 136) (block 148). A liquid is inserted into the steaming chamber (such as steaming chamber 136). A heat source (such as direct fire 138 or conventional stove 140) is activated such that the heat source (such as direct fire 138 or conventional stove 140) and the liquid source steams the paste.

In one aspect, an apparatus for steaming food includes a steaming plate having an array of apertures. An array of vents is positioned and distributed individually between the array of apertures. The steaming plate includes a surface section, an interior section, and an exterior section. A first leg is coupled to the interior section and to the exterior section. A second leg is coupled to the interior section and to the exterior section. A third leg is coupled to the inter section and to the exterior section. A handle is coupled to the surface section. An array of cups is coupled to the array of apertures. The cups have a top section. The cups having a protruded lip and a top diameter. The cup has a bottom section and a bottom diameter. The top diameter is greater than the bottom diameter. An array of lids is coupled to the array of cups. The array of lids has a knob centrally positioned on the array of lids.

Implementation may include one or more of the following. The steaming plates, the array of cups, and the array of lids may be manufactured from a metallic alloy. The steaming plate may form a circular shape. The array of apertures may be uniformly positioned along a circumference of the steaming plate. A liquid deposit hole may be positioned centrally on the steaming plate. A fourth leg may be coupled to the interior section and to exterior section. The steaming plate may form a rectangular shape. The array of apertures may be uniformly positioned on the steaming plate. A fourth leg may be coupled to the interior section and to the exterior section. The handle may be further positioned on an extrusion and a second handle may be positioned on a second extrusion. The array of apertures may have an aperture diameter. The array of vents may have a vent diameter. The aperture diameter may be greater than the vent diameter. The array of cups may have a cup length. The first leg, the second leg, the third leg, and the fourth leg may have a leg length. The leg length may be greater than the cup length.

In one aspect, a system for steaming food includes a steaming plate having an array of apertures. An array of vents is positioned and distributed individually between the array of apertures. The steaming plate includes a surface section, an interior section, and an exterior section. A first leg is coupled to the interior section and to the exterior section. A second leg is coupled to the interior section and to the exterior section. A third leg is coupled to the inter section and to the exterior section. A handle is coupled to the surface section. An array of cups is coupled to the array of apertures. The cups have a top section. The cups having a protruded lip and a top diameter. The cup has a bottom section and a bottom diameter. The top diameter is greater than the bottom diameter. An array of lids is coupled to the array of cups. The array of lids has a knob centrally positioned on the array of lids. A steaming chamber has a volume such that the steaming plate is insertable into the volume.

Implementation may include one or more of the following. The steaming plates, the array of cups, and the array of lids may be manufactured from a metallic alloy. The steaming plate may form a circular shape. The array of apertures may be uniformly positioned along a circumference of the steaming plate. A liquid deposit hole may be positioned centrally on the steaming plate. A fourth leg may be coupled to the interior section and to exterior section. The steaming plate may form a rectangular shape. The array of apertures may be uniformly positioned on the steaming plate. A fourth leg may be coupled to the interior section and to the exterior section. The handle may be further positioned on an extrusion and a second handle may be positioned on a second extrusion. The array of apertures may have an aperture diameter. The array of vents may have a vent diameter. The aperture diameter may be greater than the vent diameter. The array of cups may have a cup length. The first leg, the second leg, the third leg, and the fourth leg may have a leg length. The leg length may be greater than the cup length.

In one aspect, a method for steaming food includes removing an outer of a plurality of beans. The plurality of beans is grounded with a sauce and a plurality of spices such that a paste is formed. The paste is inserted into a steaming apparatus. The steaming apparatus has an array of apertures. An array of vents is positioned and distributed individually between the array of apertures. The steaming plate includes a surface section, an interior section, and an exterior section. A first leg is coupled to the interior section and to the exterior section. A second leg is coupled to the interior section and to the exterior section. A third leg is coupled to the inter section and to the exterior section. A handle is coupled to the surface section. An array of cups is coupled to the array of apertures. The cups have a top section. The cups having a protruded lip and a top diameter. The cup has a bottom section and a bottom diameter. The top diameter is greater than the bottom diameter. An array of lids is coupled to the array of cups. The array of lids has a knob centrally positioned on the array of lids. The steaming apparatus is inserted into a steaming chamber. A liquid is inserted into the steaming apparatus. A heat source coupled to the steaming chamber is activated such that the heat source and the liquid source steams the paste.

Implementation may include one or more of the following. The steaming plates, the array of cups, and the array of lids may be manufactured from a metallic alloy. The steaming plate may form a circular shape. The array of apertures may be uniformly positioned along a circumference of the steaming plate. A liquid deposit hole may be positioned centrally on the steaming plate. A fourth leg may be coupled to the interior section and to exterior section. The steaming plate may form a rectangular shape. The array of apertures may be uniformly positioned on the steaming plate. A fourth leg may be coupled to the interior section and to the exterior section. The handle may be further positioned on an extrusion and a second handle may be positioned on a second extrusion. The array of apertures may have an aperture diameter. The array of vents may have a vent diameter. The aperture diameter may be greater than the vent diameter. The array of cups may have a cup length. The first leg, the second leg, the third leg, and the fourth leg may have a leg length. The leg length may be greater than the cup length.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for steaming food comprising:
    a steaming plate having:
        an array of apertures;
        an array of vents positioned and distributed individually between the array of apertures;
        a surface section;
        an interior section; and
        an exterior section;
        a first leg coupled to the interior section and to the exterior section;
        a second leg coupled to the interior section and to the exterior section; and
        a third leg coupled to the interior section and to the exterior section;
        a handle coupled to the surface section;
    an array of cups couplable to the array of apertures, the cups having:
        a top section having a protruded lip and a top diameter ($D_T$); and
        a bottom section having a bottom diameter ($D_B$), wherein the top diameter ($D_T$) is greater than the bottom diameter ($D_B$); and
    an array of lids couplable to the array of cups, the array of lids having a knob centrally positioned on the array of lids; and wherein the steaming plate forms a circular shape, the array of apertures are uniformly positioned along a circumference of the steaming plate, a liquid deposit hole is positioned centrally on the steaming plate, and a fourth leg is coupled to the interior section and to the exterior section.

2. The apparatus of claim 1 wherein the steaming plates, the array of cups, and the array of lids are manufactured from a metallic alloy.

3. The apparatus of claim 1 wherein the array of apertures has an aperture diameter ($D_A$), and the array of vents has a vent diameter ($D_V$), wherein the aperture diameter ($D_A$) is greater than the vent diameter ($D_V$).

4. A system for steaming food comprising:
    a steaming plate having:
        an array of apertures;
        an array of vents positioned and distributed individually between the array of apertures;
        a surface section;
        an interior section; and
        an exterior section;
        a first leg coupled to the interior section and to the exterior section;

a second leg coupled to the interior section and to the exterior section; and
a third leg coupled to the interior section and to the exterior section;
a handle coupled to the surface section;
an array of cups couplable to the array of apertures, the cups having:
a top section having a protruded lip and a top diameter ($D_T$); and
a bottom section having a bottom diameter ($D_B$), wherein the top diameter ($D_T$) is greater than the bottom diameter ($D_B$);
an array of lids couplable to the array of cups, the array of lids having a knob centrally positioned on the array of lids; and
a steaming chamber having a volume, such that the steaming plate is insertable into the volume; and wherein the steaming plate forms a circular shape, the array of apertures are uniformly positioned along a circumference of the steaming plate, a liquid deposit hole is positioned centrally on the steaming plate, and a fourth leg is coupled to the interior section and to the exterior section.

5. The system of claim 4 wherein the steaming plates, the array of cups, and the array of lids are manufactured from a metallic alloy.

6. The system of claim 4 wherein the array of apertures has an aperture diameter ($D_A$), and the array of vents has a vent diameter ($D_V$), wherein the aperture diameter ($D_A$) is greater than the vent diameter ($D_V$).

7. A method for preparing a meal comprising:
removing an outer layer of a plurality of beans;
grinding the plurality of beans with a sauce and a plurality of spices such that a paste is formed;
inserting the paste into a steaming apparatus, the steaming apparatus having:
a steaming plate having:
an array of apertures;
an array of vents positioned and distributed individually between the array of apertures;
a surface section;
an interior section; and
an exterior section;
a first leg coupled to the interior section and to the exterior section;
a second leg coupled to the interior section and to the exterior section; and
a third leg coupled to the interior section and to the exterior section;
a handle coupled to the surface section;
an array of cups couplable to the array of apertures, the cups having:
a top section having a protruded lip and a top diameter ($D_T$); and
a bottom section having a bottom diameter ($D_B$), wherein the top diameter ($D_T$) is greater than the bottom diameter ($D_B$); and
an array of lids couplable to the array of cups, the array of lids having a knob centrally positioned on the array of lids; and wherein the steaming plate forms a circular shape, the array of apertures are uniformly positioned along a circumference of the steaming plate, a liquid deposit hole is positioned centrally on the steaming plate, and a fourth leg is coupled to the interior section and to the exterior section;
inserting the steaming apparatus into a steaming chamber;
inserting a liquid into the steaming apparatus;
activating a heat source coupled to the steaming chamber such that the heat source and the liquid source steams the paste.

8. The method of claim 7 wherein the array of apertures has an aperture diameter ($D_A$), and the array of vents has a vent diameter ($D_V$), wherein the aperture diameter ($D_A$) is greater than the vent diameter ($D_V$).

* * * * *